US006962478B2

(12) United States Patent
Tsipov

(10) Patent No.: US 6,962,478 B2
(45) Date of Patent: Nov. 8, 2005

(54) VERTICAL AXIS WINDMILL

(76) Inventor: Michael Tsipov, 30-26 Brighton 14th St., Brooklyn, NY (US) 11235

( * ) Notice: Subject to any disclaimer, the term of this patent is extended or adjusted under 35 U.S.C. 154(b) by 128 days.

(21) Appl. No.: 10/359,335

(22) Filed: Feb. 7, 2003

(65) Prior Publication Data
US 2004/0156723 A1 Aug. 12, 2004

(51) Int. Cl.$^7$ ................................... F03D 7/00
(52) U.S. Cl. .................... 415/4.2; 415/907; 416/41
(58) Field of Search .................. 415/4.2, 4.4, 907; 416/119, 42, 41, 183, 185, 186 R

(56) References Cited

U.S. PATENT DOCUMENTS

| 127,771 | A | * | 6/1872 | Hosey | ............. | 415/4.2 |
|---|---|---|---|---|---|---|
| 177,597 | A | * | 5/1876 | Ward | ............. | 415/4.2 |
| 243,751 | A | * | 7/1881 | Althouse | ............. | 415/4.2 |
| 4,070,131 | A | * | 1/1978 | Yen | ............. | 415/4.4 |
| 4,132,282 | A | * | 1/1979 | Sparks | ............. | 415/907 |
| 4,822,239 | A | * | 4/1989 | Tsipov | ............. | 415/125 |

FOREIGN PATENT DOCUMENTS

DE  4200784 A1 * 7/1993  ............. F03D/3/00

* cited by examiner

Primary Examiner—Edward K. Look
Assistant Examiner—Igor Kershteyn
(74) Attorney, Agent, or Firm—I. Zborovsky

(57) ABSTRACT

A vertical axis windmill has an immovable, hollow circumferential frame having a plurality of peripheral openings, and rotatable turbine arranged inside the frame and connectable to a generator of electric energy, the turbine having a plurality of vanes each having a working side and a non-working side, and a plurality of gate elements turnably connected with the frame for closing and opening of the openings of the frame by wind flowing substantially in a horizontal plane, the gate elements and the vanes of the turbine being formed so that at one side of the frame the wind opens the gate members by turning them in a predetermined direction, so that at one side the wind turns the gate elements so as to open corresponding ones of the openings, enters the frame through the corresponding opened openings and acts on the working side of corresponding ones of the vanes so as to rotate the turbine in the predetermined direction, while at the same time at the other side of the frame the wind closes other offset gate members.

7 Claims, 4 Drawing Sheets

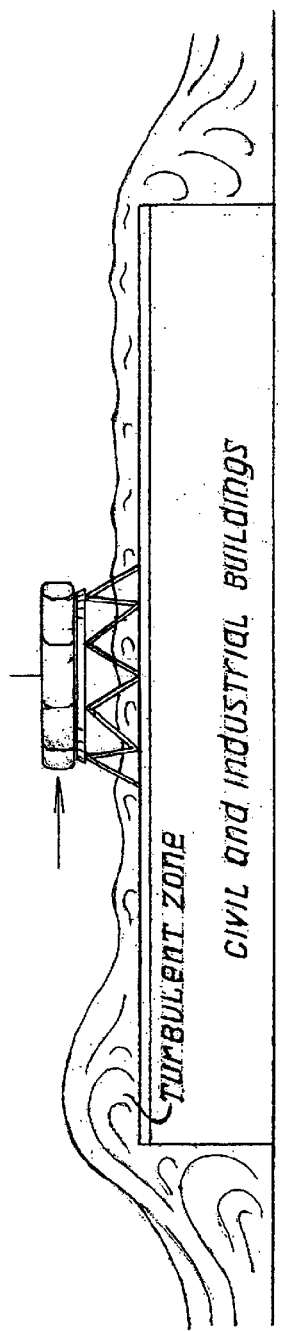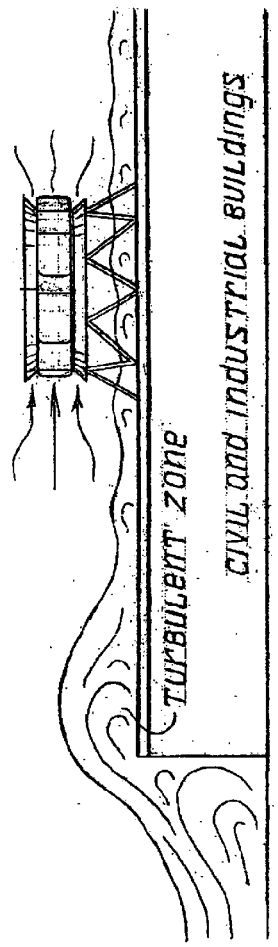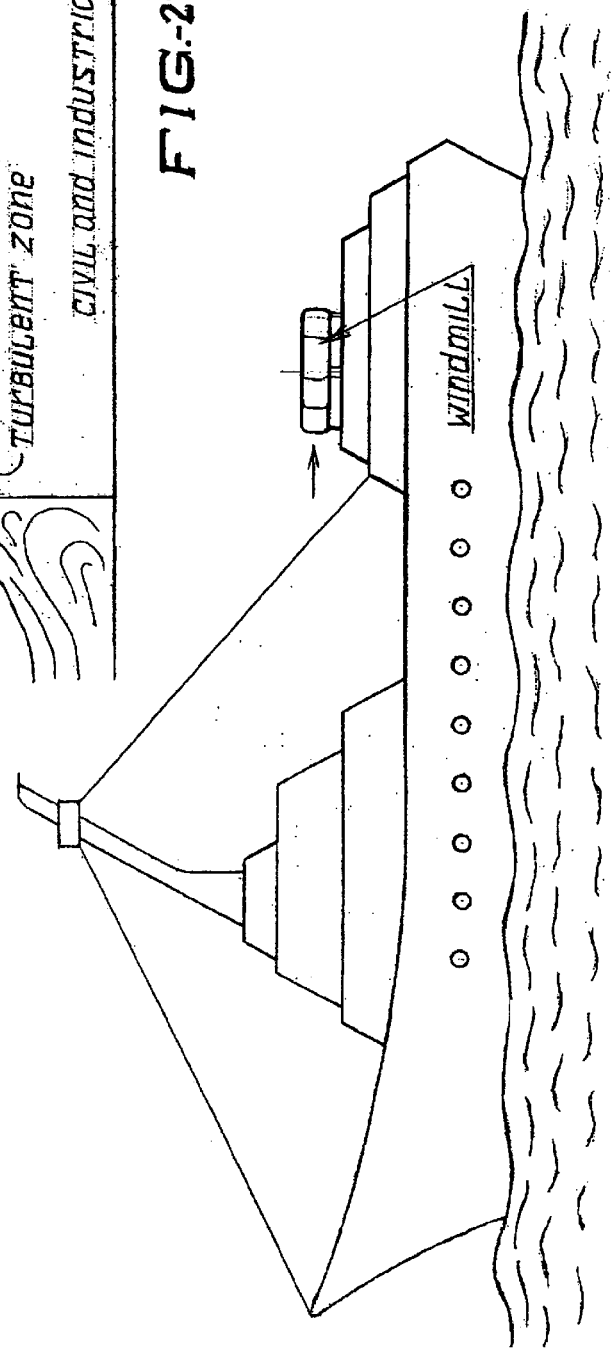

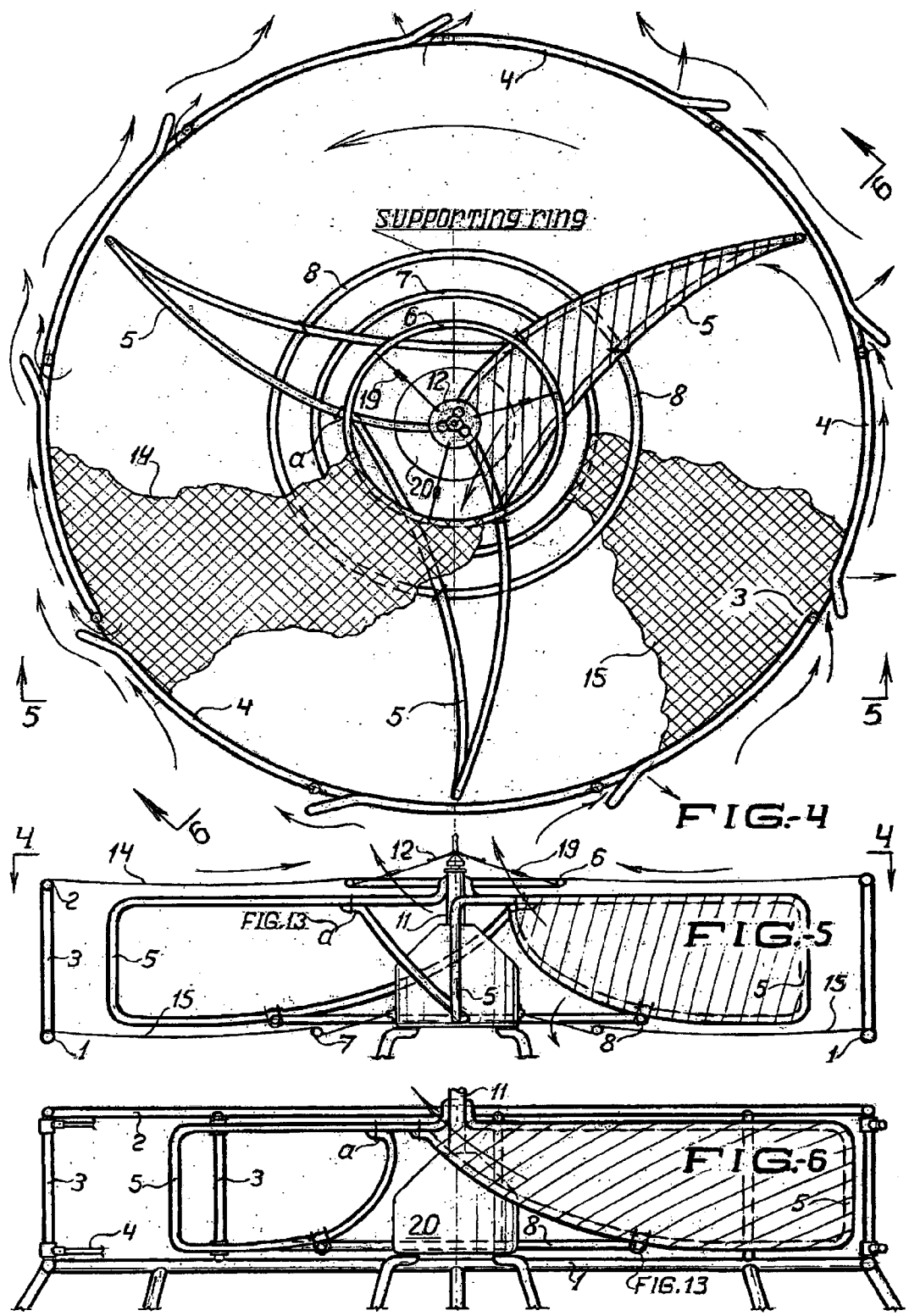

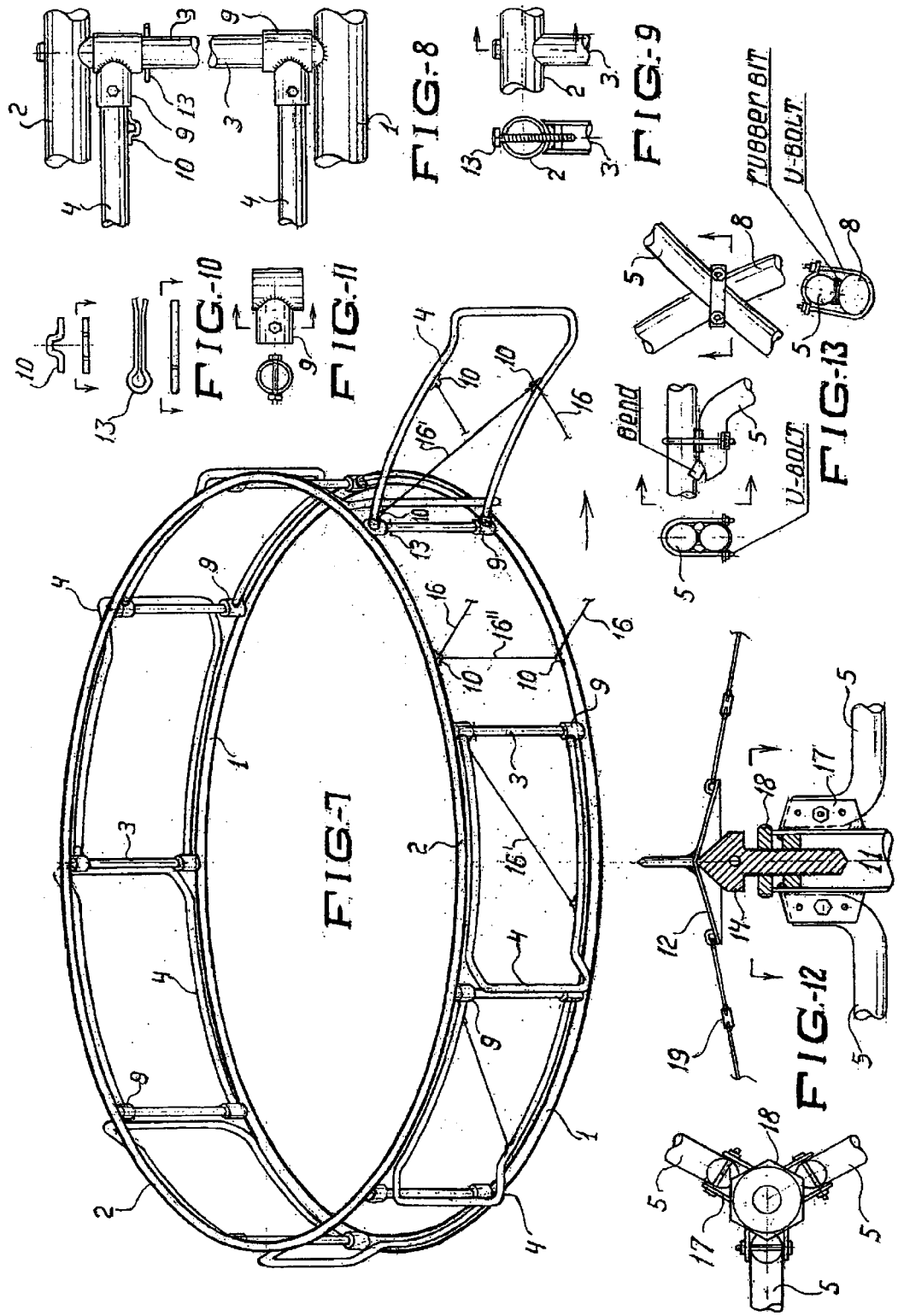

VERTICAL AXIS WINDMILL

BACKGROUND OF THE INVENTION

The present invention relates to devices for capturing the power of wind, and more particularly to such devices wherein a wind power is converted to rotational mechanical energy.

More particularly, the present invention relates to windmill having an axis of rotation which is oriented generally perpendicular with respect to the surface of the earth, or so-called vertical axis windmills. Windmills of the above mentioned general type are known in the art. One of such windmills is disclosed in our U.S. Pat. No. 4,822,239. The existing windmills with a vertical axis of rotation operate in a horizontal plane and, in addition to the useful energy, give away a significant part of it for compensation of mechanical, hydraulic, and aerodynamic losses. Such losses include losses for friction in a rotary mechanism, friction of blades in contact with air, losses connected with viscosity of air which causes sticking of airstreams on the blades, braking whirling, etc. The main loss is however loss for a front resistance of blades. It is believed to be advisable to further improve the existing windmills of this type to increase their efficiency and to reduce their losses.

SUMMARY OF THE INVENTION

According, it is an object of the present invention to provide a vertical axis windmill which is a further improvement of the existing windmills.

In keeping with these objects and with others which will become apparent hereinafter, one feature of the present invention resides, briefly stated, in a vertical axis windmill, an axle adapted to be located substantially vertically; a turbine frame arranged on said axle and a central hub so as to rotate together with the latter; and a plurality of gate members turnably connected with said frame of the windmill and formed so that when said turbine frame together with said axle rotates in a predetermined direction, said gate members being openable in the same predetermined direction.

When the windmill is designed in accordance with the present invention, it eliminates the disadvantages of the prior art and provides for the highly advantageous results.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a view showing the inventive windmill arranged on a roof of a building;

FIG. 2' is a view showing the windmill of FIG. 2 with an aerodynamic screen;

FIG. 3 is a view showing a windmill mounted on a water craft;

FIG. 4 is a view of the inventive windmill from above, showing main elements of the windmill;

FIG. 5 is an end view of the inventive windmill from its inner side as seen in accordance with arrows 5—5;

FIG. 6 is a view showing a transverse cross-section of the windmill in accordance with the arrow 6—6;

FIG. 7 is a perspective view showing a frame of the windmill with air gates attached;

FIG. 8 is a view showing upper and lower units of mounting of air gates;

FIG. 9 is a view showing an assembly for fixing an upper circle of the windmill on vertical supports, in an assembled condition;

FIG. 10 is a view showing individual components including a bracket for fixing of flexible braces and a pin for supporting of the upper assembly for air gate mounting;

FIG. 11 is a view showing a welded element composed of pipes for the upper and lower assemblies of mounting of air gates with a bolt connection of a gate frame;

FIG. 12 is a view showing a central upper assembly unit of the device in a cross-section with an adjustable spear-shaped support inserted in a supporting pipe of the axle of rotation and a hub and rotating together with the assembly with wings, while a concave disc which support the non rotatable upper roof of the device and is arranged on a pick-shaped support; and FIG. 13 is a view showing assemblies for connecting of the frame of wings and a lower part of the frame of the wing with a supporting ring, in an assembled condition.

DESCRIPTION OF THE PREFERRED EMBODIMENTS

Figure 1:
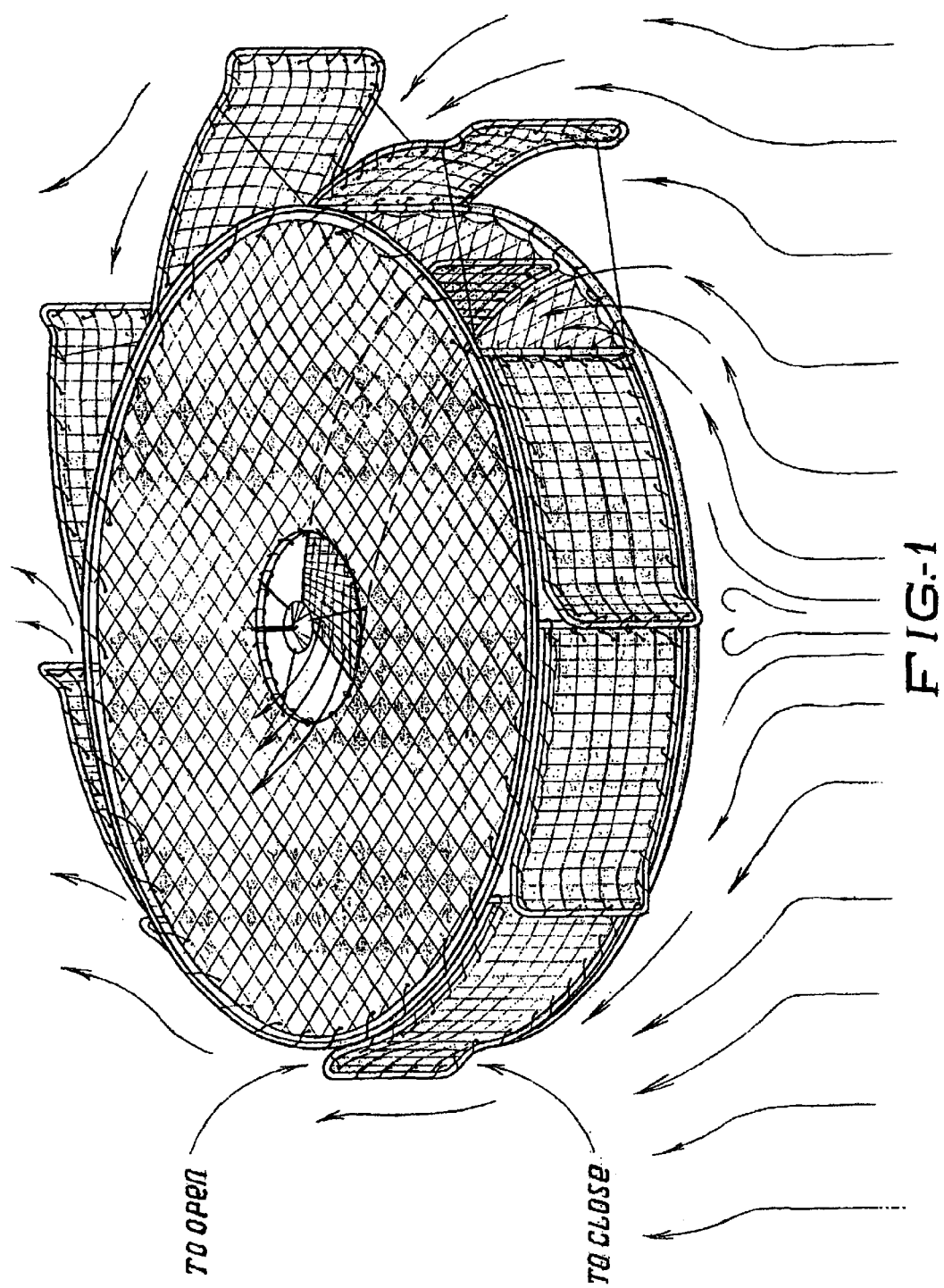
FIG. 1 is a perspective view of an operating windmill in accordance with the present invention with air streams around it.

A windmill in accordance with the present invention has a substantially cylindrical shape with a very small axial extension. An immovable frame of the inventive windmill includes two circular elements 1 and 2 which are located horizontally and composed in the shown embodiment of pipes. Vertical supports 3 extend between the circular elements 1 and 2 and are also composed of pipes. The lower end of the supports can be welded to the lower circular element 1 as shown in FIG. 8. The upper end of the supports can have a bolt connection with the circular element 2. For this purpose a bolt 13 is screwed into a nut which is welded to an upper part of the support 3 as shown in FIG. 9. Each vertical support 3 carries a base element 4 which is composed also of pipes as shown in FIGS. 4, 7, 8, 10, 11. The spaces formed by the contours of the circular elements 1 and 2 and the contours of the gates elements 4 can be filled with an elastic material. For example a technical fabric 14, 15 can be arranged there and composed of threads. A turbine with vanes 5 is located inside the frame rotatably around an axis. Each gate element 4 has a main part which in the closed condition coincides with the periphery of the frame, and an end part which is bent away to be spaced from the peripheral surface of the frame.

The central axle of rotation and hub is formed by a pipe 11 which in its lower part is supported on horizontal and vertical bearings arranged in an energy unit 20. One or a plurality of electrical generators of the energy unit is connected to the axle in its lower part, as known in the art.

For operation of the gates elements, flexible rods are tied to brackets 10 which are welded at the inner side to the pipes of the main frame and the air gates. The rods 16 form limiting elements for opening of the gate. Rods 16' are used for maintaining the geometrical shape of the frame. Rods 16" form limiting elements during closing of the gates.

The vanes 5 of the turbine are composed each of a single element which is curved in a horizontal plane as considered on a plan view and therefore has a concave, working side on which a wind acts, and an opposite convex, non-working side. In the center of the windmill the upper part of the vane is connected with members 17 welded to the pipe 11, by means of a bolt as shown in FIG. 12. The lower part of the vane is lifted in the center at a higher level and connected to an upper part of the other vane by a U-bolt as shown in FIGS. 4, 5, 6, and 13. In other words, each vane is curved in a vertical plane. In view of the curvature of each vane in a horizontal plane and the curvature in the vertical plane each vane is "twisted". As a result of this shape of the vanes, the spent air is directed upwardly and immediately leaves the turbine so as to release a space for a next portion of air. In addition the lower parts of the wings are supported and connected to a supporting ring 8 as shown in FIGS. 4, 5, 6, and 13. The vanes also can be composed of pipes, and their back side can be covered by a smooth sheet material or a smooth technical fabric.

The top and the bottom of the windmill have round openings in the center, which are formed by the rings 6 and 7. The technical fabric 15 and 14 approaches from the periphery to the rings 6 and 7 and is fixed to them. The rings 6, 7, 8 are also composed of pipes. The adjustment of the level of roof is made by an element 14 and fixed by a counter nut 18.

Each of the air gates has a main part which is folded and in closed position protruded from the periphery of the frame, and a bent out gates, to be impinged by wind.

The energy unit 20 with the axis is installed and centered in situ. The centering of the element 12 is performed on the turn buckle 19. The frame of the turbine is balanced for obtaining a horizontal position.

The main feature of the windmill in accordance with the present invention is its self adjustment by means of wind. Regardless of changes in direction of wind, it will always close the gate elements of the windmill from the side of its nonworking zone, and at the same time will always open the gate elements from the side of its working zone in which the inner vanes are operated for rotation in a wind direction.

As can be seen from FIG. 1, when the wind blows in a horizontal plane in direction toward the windmill or in FIG. 1 in direction from a bottom to a top of the drawing, it reaches the windmill and is split to the left and to the right. The right portion of the wind in a working zone turns the gate elements in a counterclockwise direction and opens the openings, enters the windmill and rotates the turbine in the counterclockwise direction, while the left portion of the wind closes the gate elements at the left, non-working zone.

The cylindrical shape of the windmill splits the wind flow of any direction and of any speed at its level and location. In accordance with the law of mass saving and the Bernulli low, the split flow laminarily goes around the cylindrical surface of the windmill in immediate vicinity to its widest part and therefore increases the speed of movement. In other words, with respect to a main direction of wind, at the left and right side of the windmill, the flow which goes around it is accelerated. During this process, at one side of the apparatus, the reinforced flow of wind closes the gate elements and keeps them closed. This prevents penetration of wind into that part of an inner space of the windmill where the vanes move opposite to the wind. Therefore, it removes the direct front braking of the rotatable vanes. Moreover, the accelerated flow along the outer surface of the windmill aspirates, through gaps between the gate elements an inner air and thereby reduces the inner resistance to the moving vanes from the non-working sides.

At the other side of the apparatus the flow which is accelerated along the surface applies pressure to the bent end portions of the gate elements and opens them. During this process a wide flow of wind shoots into the inner space of the windmill toward its working side. When the air flow reaches the working concave surface of the vane, first of all its peripheral vertical part applies pressure on it so as to cause rotation of the vane. When it gives away all its energy to the wing, the flow is replaced by a new one and slides along its bent surface, which guides the spent flow for discharge through the circular opening in the roof of the windmill. The split part of the spent air leaves the windmill also through the lower annular opening.

When the wind reaches the rear part of the working zone, it acts on the rear vanes of the turbine, and leaves through the open rear gate elements.

In the windmill in accordance with the present invention with the shape of its vanes, in the working zone which turns together with turning of wind a fast shift of airflows on the working surfaces of the vanes is provided. As a result a power lifting effect is obtained, which forcefully pushes vanes to force them in rotation. The action here is similar to the operation of a sail.

When the apparatus is installed in places with lower wind parameters, the side accelerating flows can be reinforced. For this purpose, along the contour of lower and upper planes of the apparatus, cone-shaped covers or lids can be installed as shown in FIG. 2'. With this constructions, the flows which are now captured increase in their mass. In accordance with the above-mentioned laws, the flows have the tendency to unite the mass, and at the locations of the maximum width of the apparatus the flows will slide along the covers to the central lines. This increases the mass and density of the side accelerating flows and therefore also the power.

As a result, the inventive windmill is not dependent on constant changes of wind directions. The windmill is automatically protected from direct braking of wind. After all residual air braking, it is possible to provide rotation of the windmill which is sufficient for efficient rotation of the working element of an electrical generator. With the inventive windmill it is not necessary to provide expensive high steel towers. The windmill can be arranged on roofs of highrises and other buildings in the zones which are free from turbulent flow. The windmill can be used within city borders and does not affect the air space. The energy can be obtained near the user without electrical power supply. The windmill can be produced from standard materials without any new sophisticated technology. The windmill has a very simple construction.

It will be understood that each of the elements described above, or two or more together, may also find a useful application in other types of constructions differing from the types described above.

While the invention has been illustrated and described as embodied in vertical axis windmill, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention. What is claimed as new and desired to be protected by Letters Patent is set forth in the appended claims.

What is claimed is:

1. A vertical axis windmill, comprising an immovable, hollow circumferential frame having a plurality of peripheral openings through which wind can enter to form a substantially horizontal air flow inside said frame; and a rotatable turbine arranged inside said frame and connectable to a generator of electric energy, said turbine having a plurality of vanes each having a working side and a non-working side; and a plurality of gate elements turnably connected with said frame for closing and opening of said openings of said frame by wind flowing substantially in a horizontal plane, said gate elements and said vanes of said turbine being formed so that at one side of said frame the wind opens said gate elements by turning them in a predetermined direction, so that at one side the wind turns said gate elements so as to open corresponding ones of said openings, enters said frame through said corresponding opened openings and acts on said working side of corresponding ones of said vanes so as to rotate said turbine in said predetermined direction, while at the same time at the other side of said frame the wind closes other offset gate elements, wherein each of said vanes being curved in the horizontal plane and curved in a vertical plane so as to be twisted, so that when the wind enters said frame through said open peripheral openings and moves substantially horizontally inside said frame and rotates said vanes, a spent air is diverted upwardly by said twisted vanes and immediately leaves said turbine so as to release a space for a next portion of air provided by the wind.

2. A vertical axis windmill as defined in claim 1, wherein said turbine has a central hub, said vanes extending from said central hub outwardly.

3. A vertical axis windmill as defined in claim 1, wherein each of said elements has a main portion which in a closed position when said gate elements close said openings coincide with a peripheral contour of said frame, and an end portion which in the closed position does not coincide with the peripheral surface of this frame but instead is bent away to be spaced from the peripheral surface so as to be easily acted upon by the wind, so that when said gate elements are closed an air flow is provided around said cylindrical frame, and thereby said gate elements are forcibly open by acting on the wind by said bent away end portions.

4. A vertical axis windmill as defined in claim 1; and further comprising rod means including first rods forming limiting elements for opening of said gate elements, second rods for maintaining a geometrical shape of said frame, and third rods for limiting said gate elements during closing of said gate elements.

5. A vertical axis windmill as defined in claim 1, wherein said vanes and said rod elements are formed so that when said gate elements are turned to open said openings a direction of turning coincides with a direction of rotating of said vanes of said turbine.

6. A vertical axis windmill as defined in claim 1; and further comprising conical elements arranged at a top and at a bottom of said frame.

7. A vertical axis windmill as defined in claim 1, wherein said frame has a top; and further comprising a suspending element which suspends said top and is supported on a turnable support.

* * * * *